United States Patent [19]

Voldman et al.

[11] Patent Number: 5,559,051

[45] Date of Patent: Sep. 24, 1996

[54] PROCESS FOR MANUFACTURING A SILICON CHIP WITH AN INTEGRATED MAGNETORESISTIVE HEAD MOUNTED ON A SLIDER

[75] Inventors: Steven H. Voldman, Burlington, Vt.; Albert J. Wallash, Morgan Hill, Calif.; Reginald B. Wilcox, Jr., Cambridge, Vt.

[73] Assignee: International Business Machines Corporation, Armonk, N.Y.

[21] Appl. No.: 363,465

[22] Filed: Dec. 23, 1994

Related U.S. Application Data

[63] Continuation-in-part of Ser. No. 324,841, Oct. 18, 1994.

[51] Int. Cl.$^6$ .................... H01L 21/28; H01L 21/301; H01L 21/304; H01L 21/48

[52] U.S. Cl. .................... 437/51; 437/183; 437/208; 437/218; 437/226; 437/225; 437/915; 437/974; 29/603.12; 29/603.08

[58] Field of Search .................... 437/51, 183, 208, 437/218, 226, 915, 225, 974; 29/603

[56] References Cited

U.S. PATENT DOCUMENTS

| | | | |
|---|---|---|---|
| 3,305,790 | 2/1967 | Parsons et al. | 330/6 |
| 3,667,000 | 5/1972 | Bergmans | 317/235 |
| 3,800,193 | 3/1974 | Ashar et al. | 317/235 |
| 4,246,695 | 1/1981 | Tsui | 29/603 |
| 4,275,428 | 6/1981 | Lehureau | 360/113 |
| 4,317,149 | 2/1982 | Elser et al. | 360/126 |
| 4,489,484 | 12/1984 | Lee | 29/603 |
| 4,800,454 | 1/1989 | Schwarz et al. | 360/103 |
| 4,809,103 | 2/1989 | Lazzari | 360/103 |
| 4,901,177 | 2/1990 | Lazzari | 360/113 |
| 4,939,837 | 7/1990 | Krounbi | 29/603 |
| 5,065,094 | 11/1991 | Mowry | 324/207.21 |
| 5,195,233 | 3/1993 | Kitamura et al. | 29/603 |
| 5,463,805 | 11/1995 | Mowry et al. | 29/603 |
| 5,490,028 | 2/1996 | Ang et al. | 360/126 |

FOREIGN PATENT DOCUMENTS

| | | |
|---|---|---|
| 58-224429 | 12/1983 | Japan . |
| 59-67669 | 4/1984 | Japan . |

OTHER PUBLICATIONS

Hitchner, J., Magnetic Head Assembly and Electronic Cirtiutry, Dec. 1982, vol. 25 No. 7A.

*Primary Examiner*—George Fourson
*Assistant Examiner*—David E. Graybill
*Attorney, Agent, or Firm*—Leslie G. Murray

[57] ABSTRACT

A process of making an MR head having its MR stripe protected from electro-static discharge (ESD) on a slider, such as titanium carbide. The MR stripe is protected by a plurality of silicon integrated circuit devices which conduct ESD-induced current from the MR stripe to larger components in the MR head such as the first and second shield layers and the coil layer. In a preferred embodiment the integrated circuit devices and interconnects are constructed in a single crystal silicon chip. The silicon chip is fixedly mounted to a trailing edge of the slider and the MR head is mounted on a trailing edge of the silicon chip adjacent the integrated circuit devices. The invention includes a method of mass producing sliders by combining thin film technology for making MR heads with integrated circuit technology for making integrated circuit devices. These technologies are combined at the row level to ultimate completion of individual sliders. A silicon wafer, including the integrated circuit devices, is sliced into a plurality of silicon bars, each bar including a row of circuit devices. A plurality of rows and columns of MR heads are constructed on a ceramic wafer. The ceramic wafer is then also sliced into bars, each bar including a row of MR heads. Each silicon bar is then bonded to a ceramic bar, forming composite bars of MR heads electrically connected to the circuit devices. Each composite bar is then further processed and diced into individual sliders, each slider carrying an MR head which is ESD protected.

11 Claims, 10 Drawing Sheets

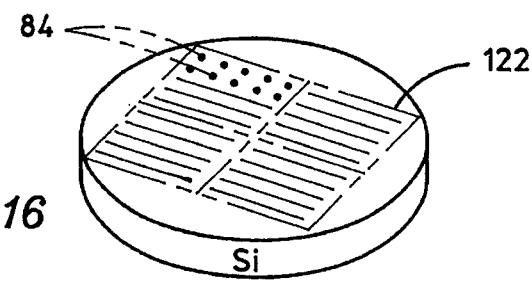
FIG. 16
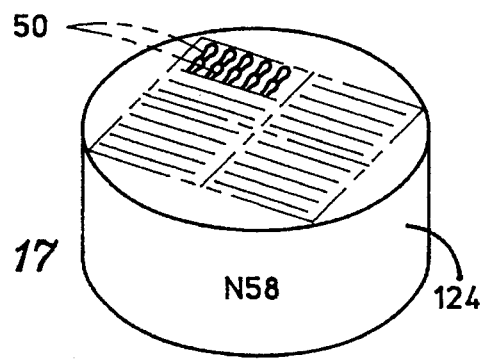
FIG. 17
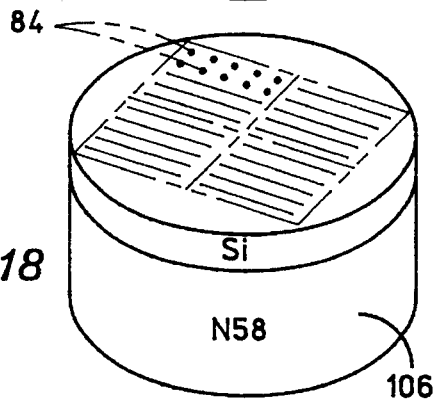
FIG. 18
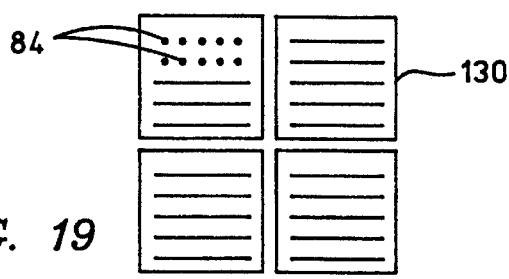
FIG. 19
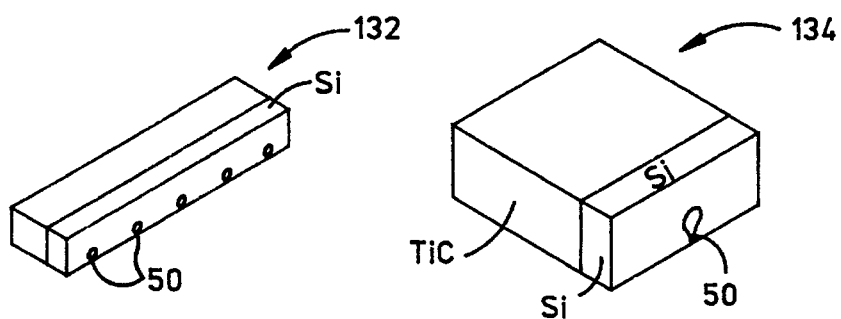
FIG. 20
FIG. 21

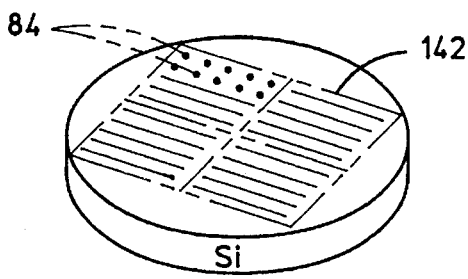
FIG. 22
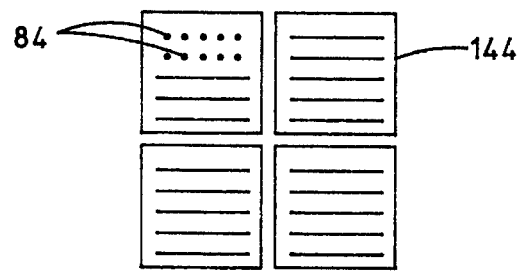
FIG. 23
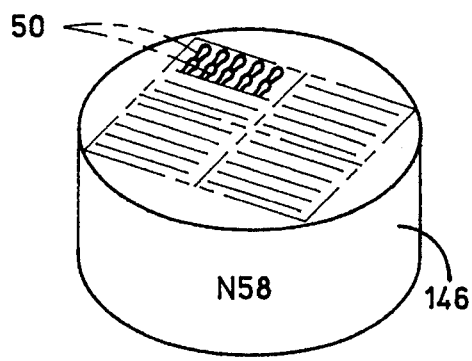
FIG. 24
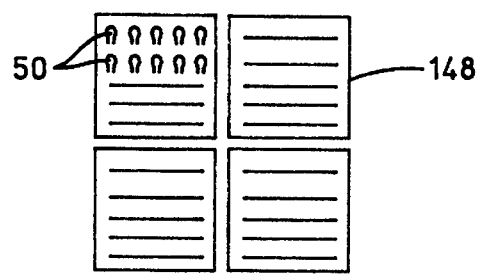
FIG. 25
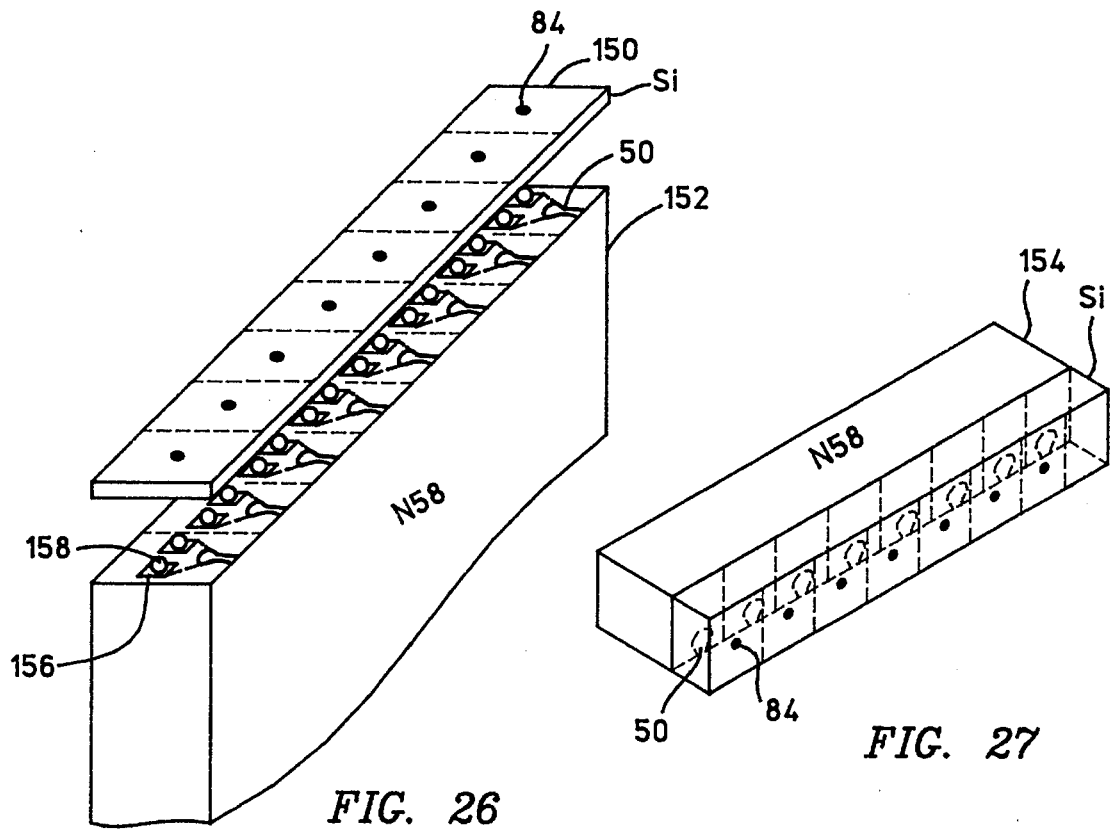
FIG. 26
FIG. 27

PROCESS FOR MANUFACTURING A SILICON CHIP WITH AN INTEGRATED MAGNETORESISTIVE HEAD MOUNTED ON A SLIDER

REFERENCE TO RELATED APPLICATIONS

The present application is a continuation-in-part of U.S. patent application Ser. No. 08/324,841 filed on Oct. 18, 1994.

BACKGROUND OF THE INVENTION

1. Field of the Invention

The present invention relates to a slider mounted silicon chip with an integrated electronic structure that includes a magnetoresistive (MR) sensor and associated circuitry, and more particularly to a silicon chip including an integrated MR head which is mounted to a trailing edge of a slider wherein the silicon chip contains integrated circuits, such as electrostatic discharge (ESD) circuits, which serve the MR sensor of the MR head.

2. Description of the Related Art

MR sensors are commonly used as read elements in thin film magnetic heads for sensing recorded signals on a magnetic medium, such as a magnetic disk. A thin film magnetic head which incorporates an MR sensor is called an MR head. An MR sensor includes a thin stripe of conductive material, such as "Permalloy" (NiFe). When a magnetic medium, such as a magnetic disk, is rotated adjacent the MR sensor, magnetic fields from the medium induce a response in the MR sensor causing the sensor to change its resistance. A sense current conducted through the MR sensor changes its magnitude proportionally to the change in resistance. The magnitude changes are then processed by channel electronics into playback signals representing information stored on the magnetic medium.

A typical MR stripe is 5 microns long, 1 micron high and 200 Angstroms thick. The length and thickness of the MR stripe are exposed at a surface of an MR head while the height is buried in the head body. During construction and assembly of the MR head, the MR stripe must be protected from electrostatic discharge (ESD) and/or electrical overstress (EOS). A discharge or impulse of only a few volts can destroy or severely damage the MR stripe. Such a discharge can occur by contact with or close proximity to a person, plastic involved in the fabrication, or components of a magnetic medium drive.

The prior art teaches the use of electrical elements to protect MR stripes from ESD and EOS. These elements include diodes which shunt excessive current away from the MR stripe to larger conductive components in the head via leads which are connected to the MR stripe. Such larger components may include shield or coil layers that form part of an integrated MR head.

ESD protection devices and MR heads have been fabricated on sliders. Standard materials in the industry for sliders have been ceramic materials, such as titanium carbide (TIC) and N58, a combination of TiC and aluminum oxide ($Al_2O_3$). Both N58 and TiC are wear resistant and easy to machine. However, ESD diodes and other circuit components, with the sensitivity and robustness required to protect an MR stripe from ESD, cannot be produced in either TiC or N58. Nevertheless, it is known that very sensitive diodes can be fabricated on a silicon wafer.

There is a strong felt need in the art to improve the ESD protection of MR stripes to the level of that provided by silicon diodes without changing the slider material from N58. Two technical challenges are involved. One is fabrication of magnetic heads on N58 sliders with thin film technology and the other is the construction of protection elements on a silicon wafer by integrated circuit technology. It would be desirable if these two technologies could be merged to provide an MR head on a slider, such as N58, which is protected from ESD by silicon elements. Further, it would be desirable if a method of fabrication could be provided which combines the two technologies for mass producing MR heads on sliders with ESD protection.

SUMMARY OF THE INVENTION

The present invention provides an MR head on a slider which is protected from ESD damage by silicon integrated circuit elements. This is accomplished by locating a silicon chip, containing the circuit elements on the trailing edge of the slider. In a preferred embodiment a thin film MR head is located on the trailing edge of the silicon chip so that when the MR head is constructed interconnects can easily be made with the integrated circuit elements. In an alternative embodiment the MR head is constructed on the trailing edge of the slider and the silicon chip is mounted adjacent the MR head making connection through pre-formed pads.

A unique series of steps have been provided for mass producing the MR head on a slider with ESD protection. Both technologies are merged at the wafer level. Integrated circuit technology is employed to construct integrated circuit elements for multiple MR heads on a silicon wafer. In a preferred embodiment this silicon wafer is fixedly attached to a wafer of slider material to provide a composite wafer. Using thin film technology a series of MR heads are constructed on top of the silicon water with connections being made to the integrated circuit elements. The composite wafer is then diced into quadrants, each quadrant containing rows and columns of sliders. Each quadrant is then diced into rows, each row containing a row of sliders. Each row is then lapped which forms an air bearing surface (ABS) for each slider. Each row is then diced into individual sliders which is the completed product.

It should be understood that integrated circuit elements including diodes could be constructed in the silicon wafer for use with the MR head. Examples of other integrated circuit elements are an amplifier for amplifying a sense signal from the MR stripe, a thermistor for sensing heat buildup or an accelerometer for sensing movement of the slider for control purposes.

An object of the present invention is to provide an MR head which is connected to silicon integrated circuit elements on a slider.

Another object of the present invention is to provide an MR head which is connected to silicon integrated circuit elements on a slider.

A further object of the present invention is to provide an MR head which is protected from ESD by silicon integrated circuit elements on a slider which is constructed of TiC.

Yet another object is to provide a method of merging thin film and integrated circuit technologies for mass producing MR heads on sliders which are protected from ESD by integrated circuit elements.

Other objects, advantages and features of the invention will be readily apparent after reviewing the following specification, claims and accompanying drawings.

DESCRIPTION OF THE DRAWINGS

FIGS. 5A–9 are schematic illustrations of a method of mass producing the first embodiment of the invention shown in FIGS. 2–4.

FIG. 5A is a schematic isometric illustration of the step of constructing a plurality of silicon integrated circuit elements on a silicon water.

FIG. 7 is a schematic illustration of the step of dicing the composite wafer into quadrants, each quadrant containing rows and columns of sliders.

FIG. 8 is a schematic isometric illustration of one of the rows of MR heads after dicing one of the quadrants of FIG. 7 into a plurality of rows of sliders.

FIG. 9 is a schematic isometric illustration of a single slider after dicing the row in FIG. 8 into individual sliders.

FIG. 16–20 are schematic illustrations of the method of constructing the second embodiment of the invention shown in FIG. 14 and 15.

FIG. 16 is a schematic isometric illustration of the step of constructing a plurality of silicon integrated circuit elements on a silicon wafer.

FIG. 17 is a schematic isometric illustration of the step of constructing rows and columns of MR heads on an N58 wafer which is used to make sliders.

FIG. 18 is a schematic isometric illustration of the step of fixedly mounting the silicon wafer to the TiC wafer to form a composite wafer.

FIG. 19 is a schematic illustration of the step of dicing the composite wafer into quadrants of rows and columns of sliders.

FIG. 20 is a schematic isometric illustration of a row of sliders after a step of dicing one of the quadrants into a plurality of rows and columns of sliders.

FIG. 21 is a schematic isometric illustration of a single slider after a step of dicing the row shown in FIG. 20 into a plurality of sliders.

FIG. 22 is a schematic isometric illustration of the step of constructing a plurality of silicon integrated circuit elements on a silicon water.

FIG. 23 is a schematic illustration of the step of dicing the silicon wafer into quadrants of rows of integrated circuit elements.

FIG. 24 is a schematic isometric illustration of the step of constructing rows and columns of MR heads on an N58 wafer.

FIG. 25 is a schematic illustration of the step of dicing the N58 wafer into quadrants of rows and columns of MR heads.

FIG. 26 is a schematic isometric illustration of the step of bonding a silicon bar to an N58 bar to provide a composite bar of MR heads connected to associated circuit elements.

FIG. 27 is a schematic isometric illustration of the completed composite bar formed in the step shown in FIG. 26.

DESCRIPTION OF THE PREFERRED EMBODIMENTS

Figure 1:
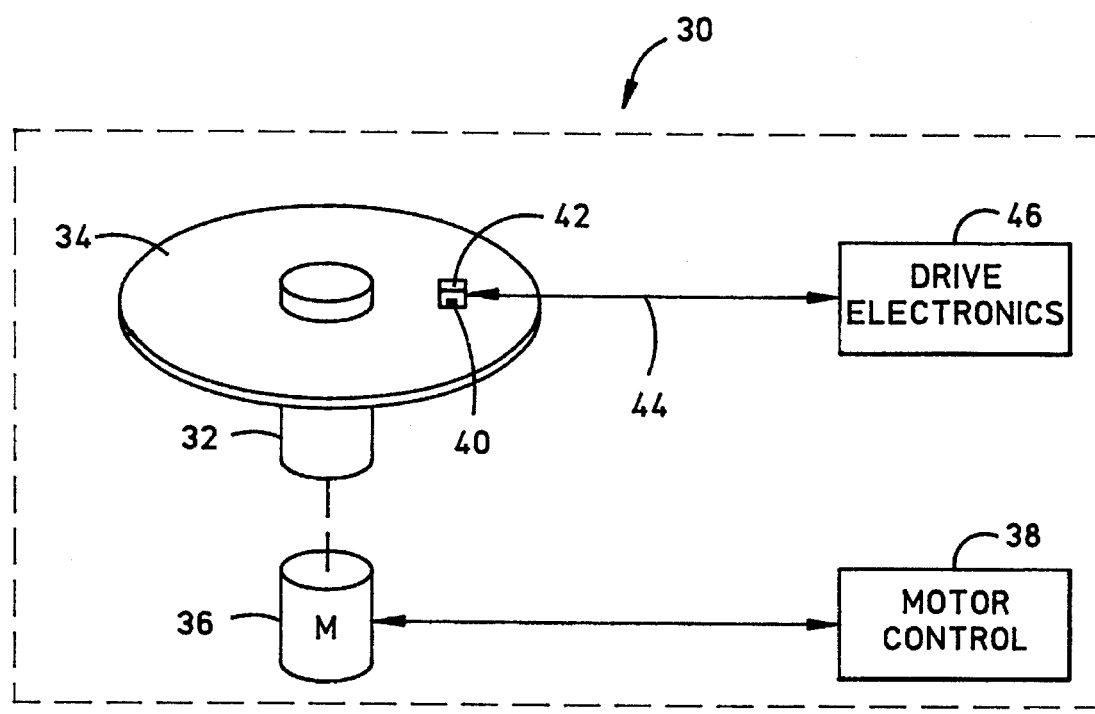
FIG. 1 is a schematic illustration of a disk drive.

Referring now to the drawings wherein like reference numerals designate like or similar parts throughout the several views, a magnetic disk drive 30 is illustrated in FIG. 1. The drive 30 includes a spindle 32 which supports and rotates at least one magnetic storage disk 34. The spindle 32 is rotated by a motor 36 which is controlled by motor controls 38. At least one magnetic read/write transducer, referred to as a magnetic head 40, is mounted on a slider 42 which, in turn, is supported by a suspension and actuator arm 44. The magnetic head 40 can include or comprise a magnetoresistive (MR) head according to the invention. The suspension and actuator arm 44 positions the slider 42 so that the magnetic head 40 is in a transducing relationship with a surface of the disk 34. When the disk 34 is rotated by the motor 36, air moved by the top of the disk together with the structure of the slider 42 causes the slider to ride on a cushion of air, referred to as an air bearing. The thickness of the air bearing, also referred to as the "flying height" of the slider, is typically less than 5.0 microinches. The magnetic head 40 is then employed for writing and reading information in multiple circular tracks on the surface of the disk 34. These information signals as well as servo signals for moving the slider to various tracks are processed by drive electronics 46 which are connected to the magnetic head 40.

Figure 2:
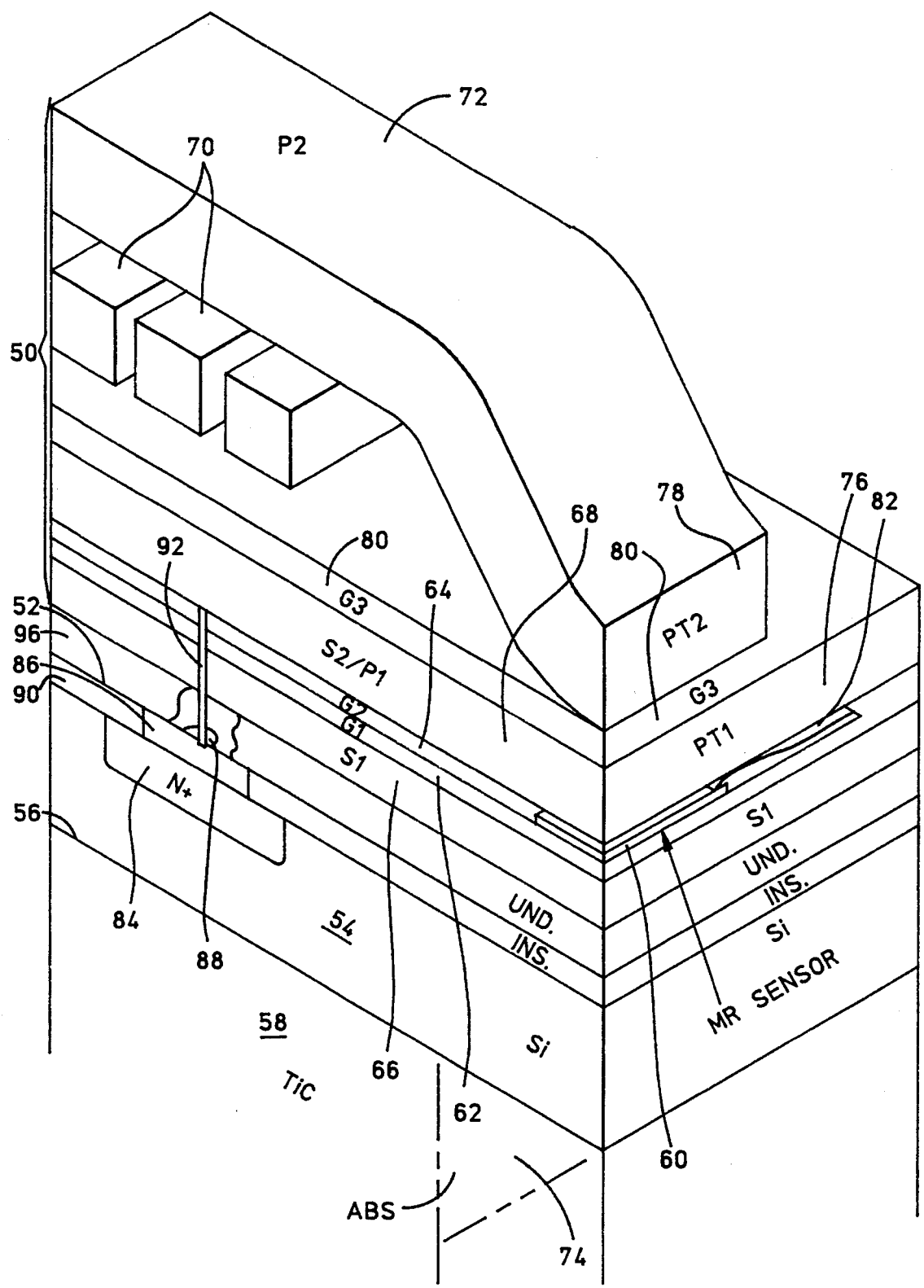
FIG. 2 is a schematic isometric cross-sectional illustration of a first embodiment of the invention which includes an MR head mounted on a silicon chip which, in turn, is mounted on the trailing edge of a slider.

FIG. 2 illustrates a first embodiment of the invention which includes a magnetic MR head 50 mounted on a trailing edge 52 of a silicon chip 54 which, in turn, is mounted on a trailing edge 56 of a slider 58. The slider 58 is preferably constructed of a ceramic material, such as titanium carbide and alumina which is a standard material in the industry for sliders. This slider material is known as N58. The silicon chip 54 is preferably single crystal silicon which will be explained in more detail hereinafter.

The magnetic head 50 includes an MR stripe 60 which is sandwiched between first and second gap layers 62 and 64 (G1 and G2, respectively) which, in turn, are sandwiched between first and second shield layers 66 and 68. A coil layer 70 is sandwiched between first and second insulation layers (not shown) which, in turn, are sandwiched between first and second pole pieces 68 and 72. The second shield layer S2 also serves as a first pole piece P1. This type of magnetic head is known in the industry as a merged MR head. The pole pieces 68 and 72 terminate at an air bearing surface (ABS) 74 in first and second pole tips 76 and 78 which are separated by a gap insulation layer 80 (G3). A sense current is coupled to the MR stripe 60 by a pair of conductor leads, one of the leads being illustrated at 82 in FIG. 2. A write function is performed by the magnetic head by the first and second pole tips when magnetic flux bridges across the gap 80 in response to magnetic flux induced into the first and second pole pieces 68 and 72 by the coil layer 70. A playback or read function is performed by the head when magnetic fields on a moving storage medium cause a change of resistance of the MR stripe. The resistance change causes a voltage change across the leads connected to the MR stripe which voltage variations are then processed into information signals.

It is important that the MR stripe 60 be protected from electro-static discharge (ESD) during its construction and during assembly of the disk drive shown in FIG. 1. A few volts can destroy or damage the MR stripe, rendering the read function of the MR head inoperative. The MR stripe 60 can be protected from ESD by a protective element which is connected to the MR stripe. A typical ESD protective element is a silicon diode which shunts ESD-induced current to larger components in the head such as the first and second shield layers 66, 68 or the inductive coil layer 70. A block diagram for such electrical connections will be described in more detail hereinafter.

The protective element may be one or more integrated circuit elements constructed in the silicon chip 54, which is preferably single crystal silicon. For example, one of a plurality of silicon diode devices is shown in the silicon chip at 84. Interconnects, one of which is shown at 86, are employed to connect the protective element 84 to other protective elements (not shown) as well as to pads, a portion of one pad being shown at 88, which are at the top surface of an insulation layer 90. Vias, one of which is illustrated at 92, extend through the various layers of the MR head from various components in the head to the pads 88 for electrically connecting the head components to the protective elements 84. Numerous vias may be provided for connecting multiple components of the MR head to multiple protective elements as will be explained in more detail hereinafter. It should be understood however that the protective elements contemplated by the invention are not restricted to silicon diodes, but may employ other silicon integrated circuit elements such as amplifiers, thermistors, and accelerometers. The silicon chip 54 is fixedly mounted to the trailing edge 56 of the slider 58. This may be accomplished by bonding with epoxy or by C-4 solder. In actual practice an overcoat (not shown) of dielectric material is deposited over the second pole piece 72 to complete the MR head. The magnetic head and the silicon chip then form a small portion of an air bearing surface (ABS) 74. The major portion of the air bearing surface is provided by the slider 58.

Figure 3:
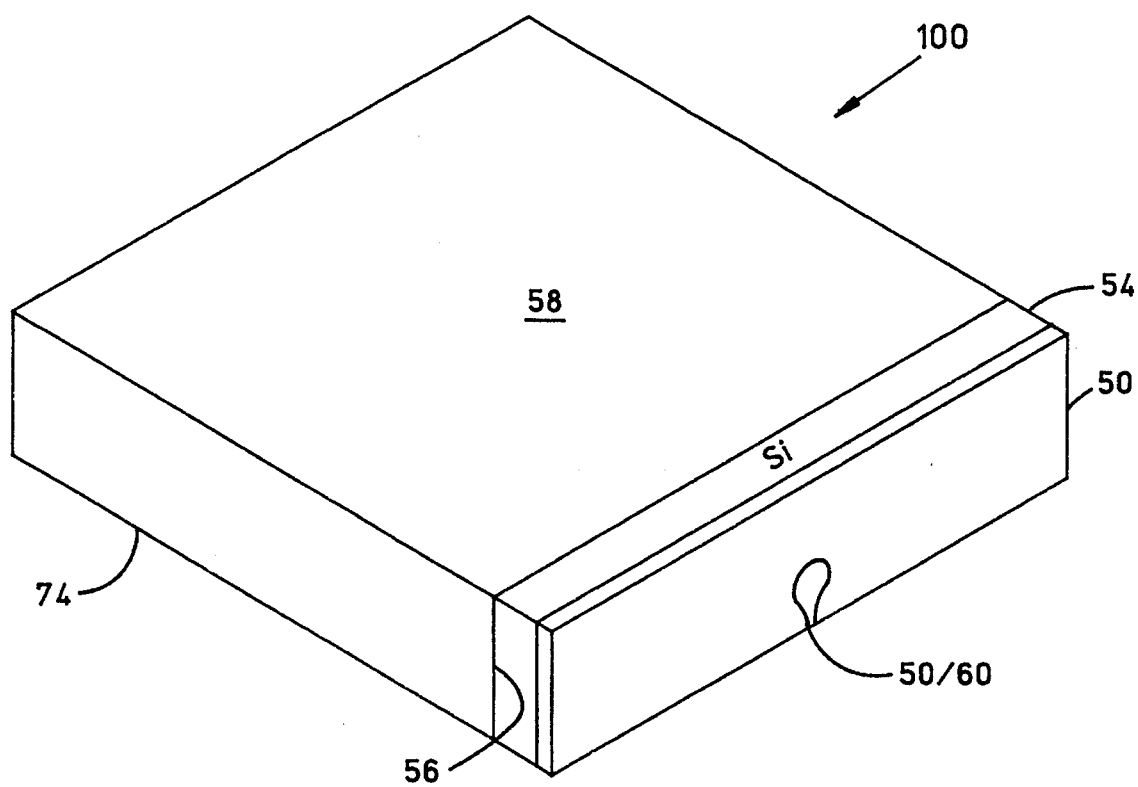
FIG. 3 is a schematic isometric illustration of the first embodiment of the invention which includes an MR head mounted on a silicon chip which, in turn, is mounted on the trailing edge of a slider.
Figure 4:
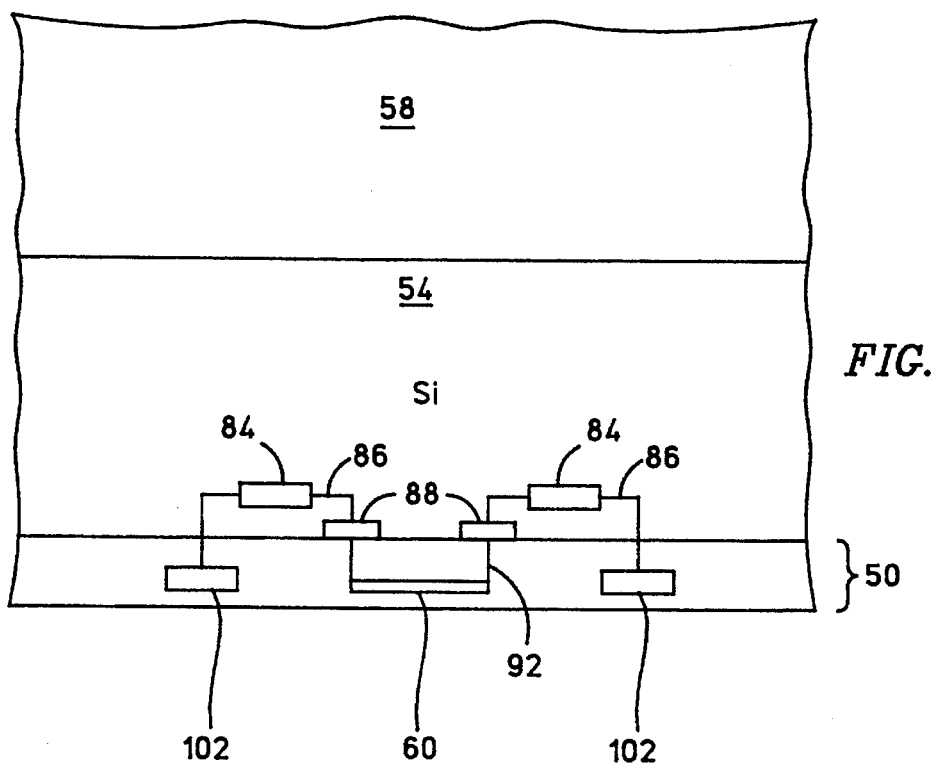
FIG. 4 is a schematic planar illustration of circuit connections of an MR stripe to a pair of silicon integrated circuit elements devices.

FIG. 3 is an illustration of the first embodiment 100 constructed according to the teachings of FIG. 2 with the magnetic head 50 shown schematically mounted on the trailing edge 56 of the silicon chip 54 which, in turn, is mounted on the trailing edge 56 of the slider 58. The ABS, which is shown at 74, is formed by the bottom surface of the magnetic head, the silicon chip 54 and the slider 58. While the description describes a single magnetic head carried by the slider, it should be understood that the slider may carry a plurality of magnetic heads according to the teachings of the present invention. FIG. 4 is an exemplary illustration of a pair of silicon protective devices 84 interconnecting the MR stripe 60 to larger head components 102 via pads 88 and via MR head vias 92.

Figure 5A:
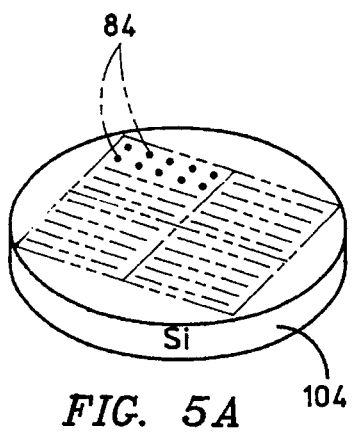
Figure 5B:
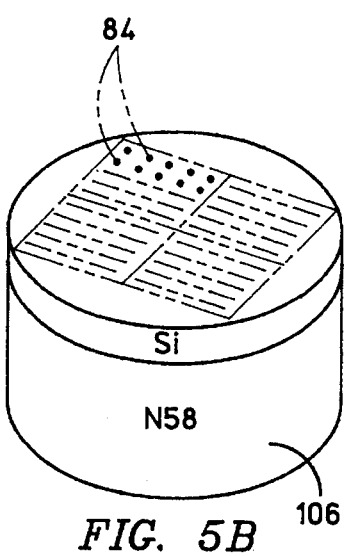
FIG. 5B is a schematic isometric illustration of the step of fixedly mounting the silicon water to a TiC wafer for constructing a plurality of sliders.

A method of constructing the first embodiment illustrated in FIGS. 2 through 4 is illustrated in a series of steps shown in FIGS. 5A through 9. In FIG. 5A the first step is to construct a plurality of protective elements using known techniques for integrated circuit fabrication on one face of a silicon wafer 104. Such elements may include silicon diodes. The next step is to fixedly mount the silicon wafer 104 on a wafer 106 of slider material, such as N58. The next step is to construct rows and columns of magnetic heads 50 on top of the silicon wafer and on top of the protective silicon devices 84 as described hereinabove with reference to FIG. 2. This provides a composite N58 composite wafer.

Figure 5C:
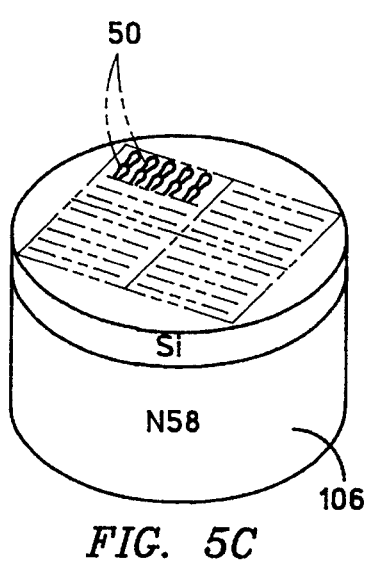
FIG. 5C is a schematic isometric illustration of constructing rows and columns of MR heads on the silicon water.
Figure 6A:
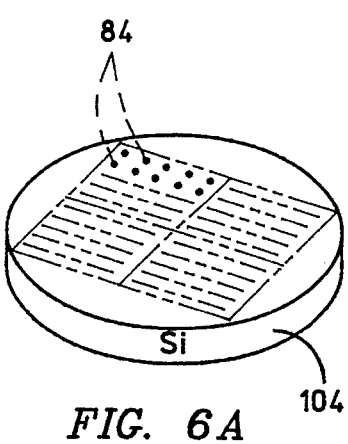
FIG. 6A is an illustration which is the same as FIG. 5A.
Figure 6B:
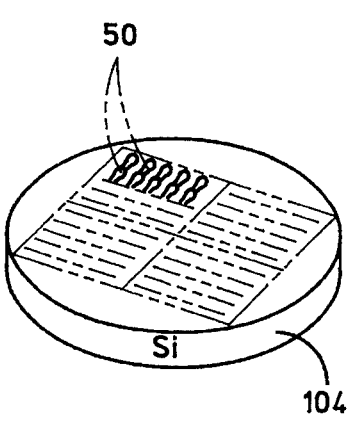
FIG. 6B is a schematic isometric illustration constructing a plurality of rows and columns of MR head on the silicon wafer before fixedly mounting the silicon wafer to the TiC wafer.
Figure 6C:
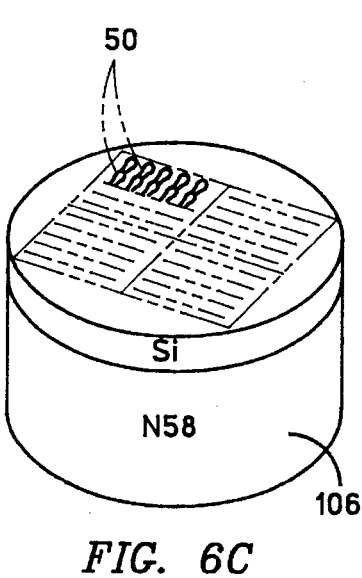
FIG. 6C is a schematic isometric illustration is the step of fixedly mounting the silicon wafer to the TiC wafer to form a composite wafer after constructing the MR heads on the silicon wafer.

Modified steps in the construction are illustrated in FIGS. 6A through 6C for achieving the composite water shown in FIG. 5C. The step shown in FIG. 6A is the same as the step implemented in FIG. 5A, namely, constructing the protective silicon devices 84 on the silicon chip 104. FIG. 6B is different in that the magnetic heads 50 are constructed on the silicon chip prior to fixedly mounting the silicon chip on the N58 wafer 106. In FIG. 6 the silicon wafer 104 of FIG. 6B is fixedly mounted to the N58 wafer 106 providing the same result as shown in FIG. 5C.

Figure 7:
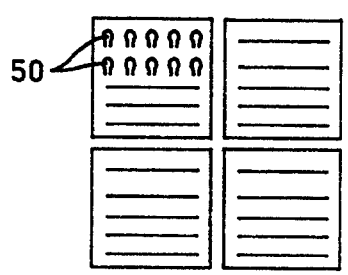
Figure 8:
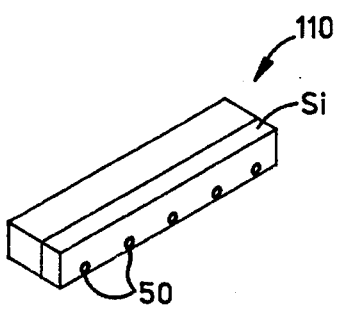
Figure 9:
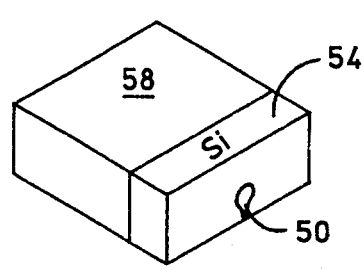

FIG. 7 illustrates a step of dicing the composite wafer of FIG. 5C or FIG. 6C into quadrants, each quadrant containing rows and columns of magnetic heads 50. FIG. 8 illustrates one row of sliders 110 after one of the quadrants 108 in FIG. 7 is diced into a plurality of rows 110 of sliders. FIG. 9 illustrates a composite single slider 58, silicon chip 54, and magnetic head 50 after dicing the row of sliders 110 in FIG. 8 into a plurality of sliders.

Figure 10:
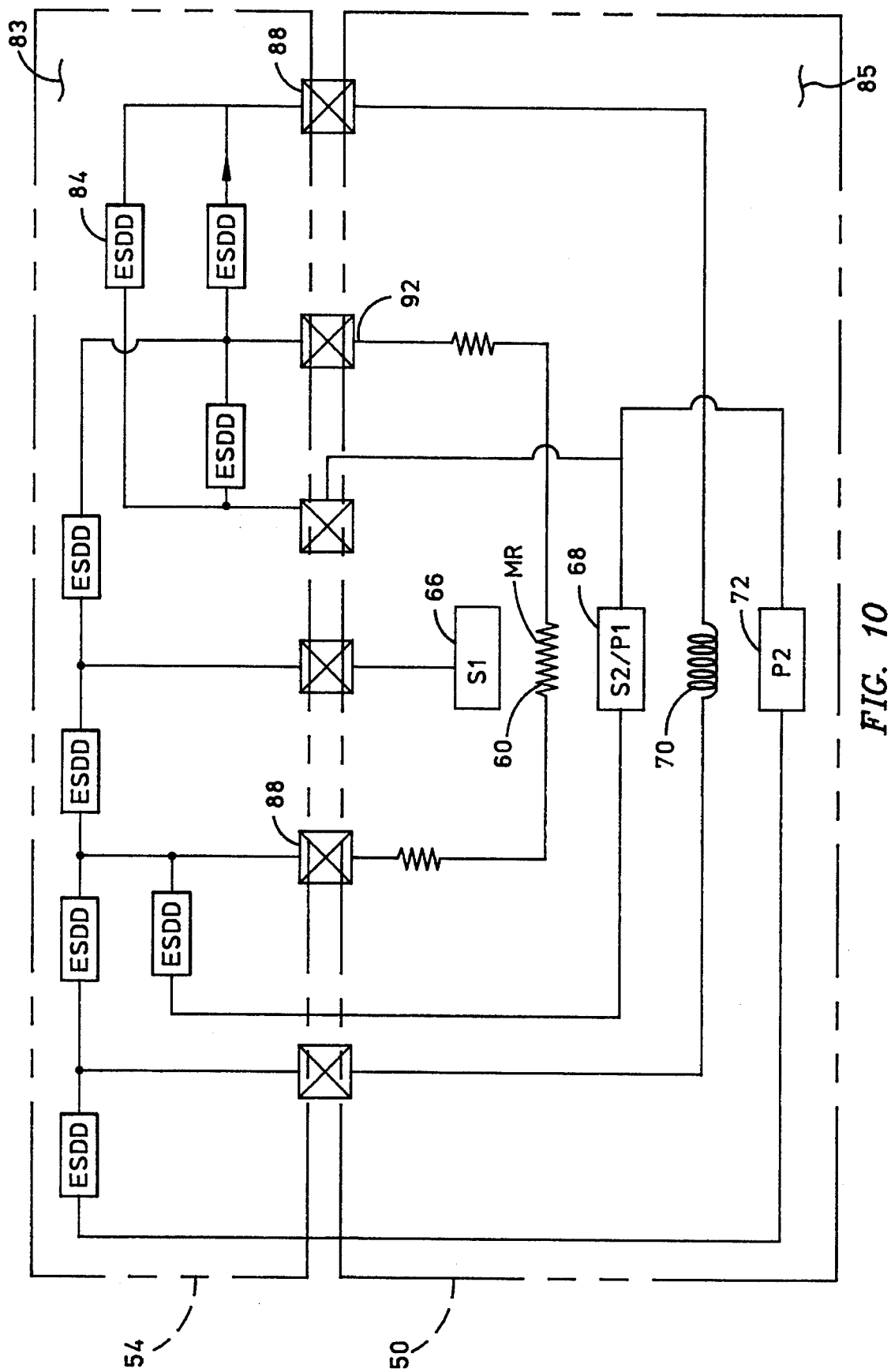
FIG. 10 is a schematic electrical diagram of the components of an MR head connected via a plurality of integrated circuit elements that provide ESD protection.

FIG. 10 is a schematic block diagram of exemplary electrical connections of protective elements 84 for shunting ESD-induced current from the MR strip 60 to the larger components of the magnetic head such as the first and second shield layers 66, 68, first and second pole pieces 68, 72 and coil layer 70.

As described above, all of the protective elements (ESDD) 84 are fabricated on the Si substrate forming a circuit 83 in a first series of process steps. The head elements are then fabricated in a second series of process steps and connected to terminal pads 88 in a layer 85 overlaying the protective circuit 83. The head elements are electrically connected to corresponding protective elements via terminal pads 88 formed at the interface between two layers.

Figure 11:
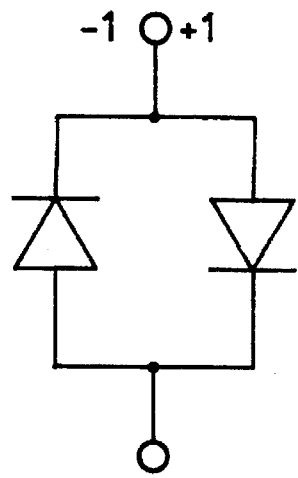
FIG. 11 is a schematic illustration of a pair of back-to-back silicon diodes.
Figure 13:
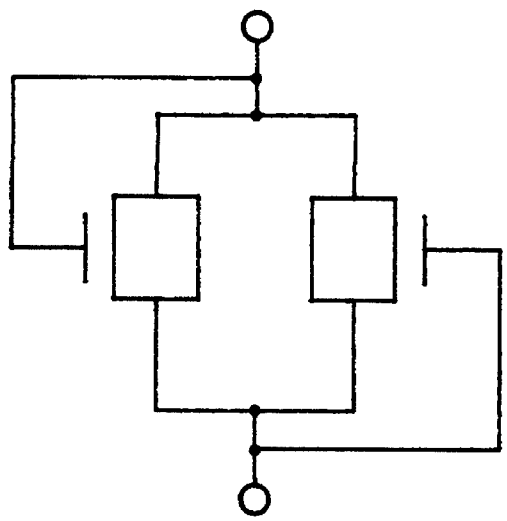
FIG. 13 is a schematic illustration of a pair of back to back field effect transistors (FETs) or TFTs.
Figure 12:
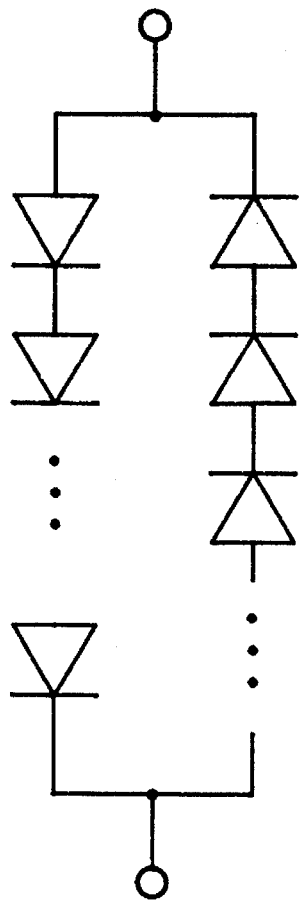
FIG. 12 is a schematic illustration of a pair of back-to-back stacked silicon diodes.

Suitable protective elements are illustrated in FIGS. 11 through 13. In FIG. 11 a pair of back-to-back silicon diodes with each leg of opposite polarity are provided so that currents of either plus or minus polarity can be conducted therethrough. It is important that the protective elements only shunt currents which exceed an operational sense level for the MR stripe. In order to accomplish this purpose, a series of diodes may be employed in each leg of the protective element as illustrated in FIG. 12. The more diodes located in each leg, the higher the voltage that will be required to cause the leg to operate and conduct current. Still another protective element is illustrated in FIG. 13 which employs a pair of field effect transistors (FETs) or thin film transistors (TFTs) which can be selectively adjusted for each leg of the protective element.

Figure 14:
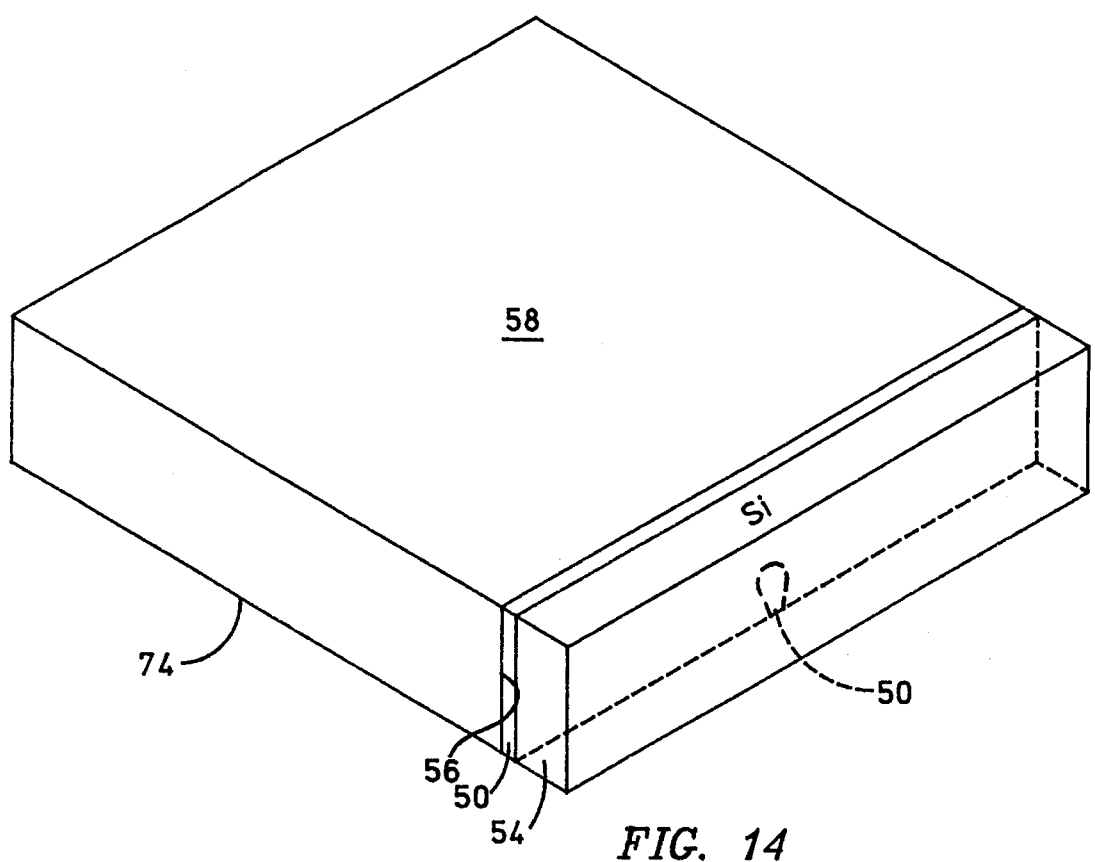
FIG. 14 is a schematic isometric illustration of a second embodiment of the present invention which includes an MR head mounted on the trailing edge of the slider between the slider and the silicon chip.
Figure 15:
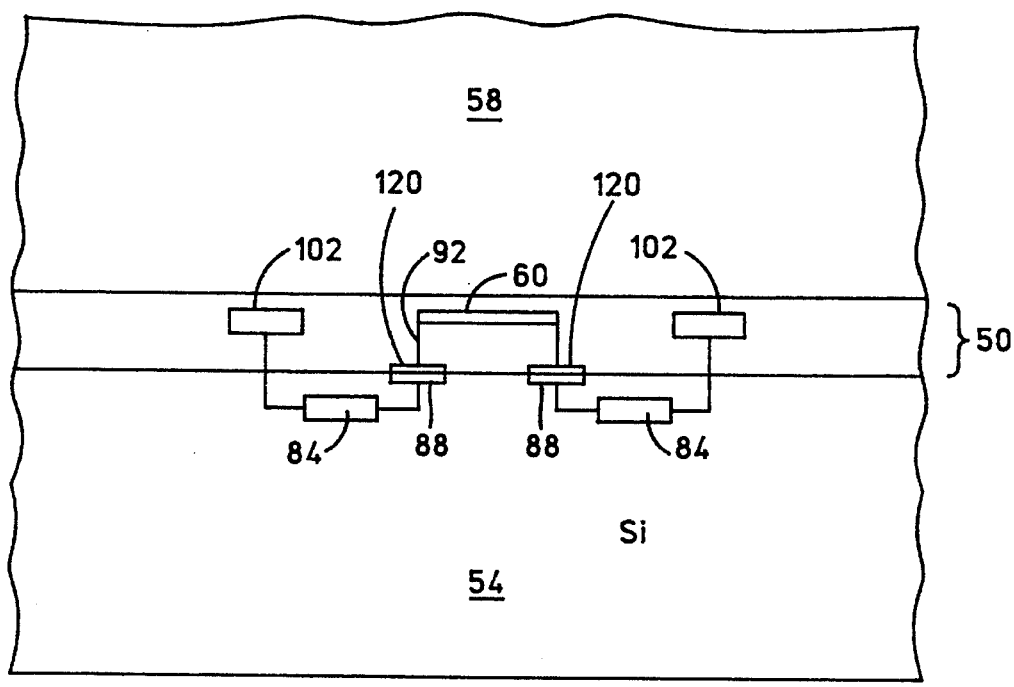
FIG. 15 is a planar schematic illustration of the connection of a pair of silicon integrated circuit elements to an MR stripe of an MR head.

FIG. 14 illustrates a second embodiment of the invention wherein the MR head 50 is constructed on the trailing edge 56 of the slider 58. In this arrangement the MR head 50 is located between the slider 58 and the silicon chip 54. FIG. 15 illustrates an exemplary connection of the MR stripe 60 to larger components 102 in the head. In this embodiment the MR stripe 60 is connected by vias 92 to a pair of pads 120 at an outer surface of the head for connection to corresponding pads 88 at an outer surface of the silicon chip. The pads 120 and 88 connect with one another when the silicon chip 54 is mounted over the MR head 50 on the slider 58. Accordingly, the MR stripe 60 is connected to the larger head components 102 via the head vias 92, the pads 120 and 88 and the protective elements 84.

FIGS. 16 through 21 illustrate the various steps in constructing the second embodiment illustrated in FIGS. 14 and 15. FIG. 16 illustrates the step of constructing the protective elements on the silicon wafer 122. FIG. 17 illustrates the step of constructing the MR heads on the N58 wafer 124. FIG. 18 illustrates the step of fixedly mounting the silicon wafer 122 to the N58 wafer 124. FIG. 19 illustrates dicing the composite wafer of FIG. 18 into quadrants 130 which contain rows and columns of the desired sliders. FIG. 20 illustrates a row of desired sliders after a step of dicing one of the quadrants 130 of FIG. 19 into a plurality of rows of sliders. FIG. 21 illustrates a composite slider, MR head, and silicon chip 134 after dicing the row of slider 132 into a plurality of individual sliders. One advantage of this method over the method illustrated in FIGS. 5A–9 is that the heat in constructing the MR heads on the wafer 124 will not damage the bonding of the wafer 122 to 124 as illustrated in FIG. 18.

FIGS. 22–28 illustrate the various steps in another preferred method for fabrication of the second embodiment illustrated in FIGS. 14 and 15. FIG. 22 illustrates the step of fabricating in rows a plurality of protective elements using conventional techniques for integrated circuit fabrication on a face of a silicon wafer 142. FIG. 24 illustrates the step of fabricating rows of magnetic heads 50 on a top surface of a wafer 46 of suitable material such as N58. As illustrated by FIGS. 23 and 25, the silicon wafer 142 is then diced or separated into quadrants 144 and subsequently diced into a plurality of rows 150 containing a plurality of protective elements 84. Similarly, FIG. 25 illustrates the step of dicing or separating the N58 wafer 146 into quadrants and then subsequently dicing each quadrant into a plurality of rows 152, each row including a plurality of heads 50. Each row 150 of protective elements 84 is then attached to a row 152 of heads 50 to provide a row 154 of composite heads 50 and protective circuits 84 as illustrated in FIG. 27. The composite row 154 may then be further processed to pattern the head air bearing surfaces and diced into individual sliders as shown in FIG. 14.

Figure 28:
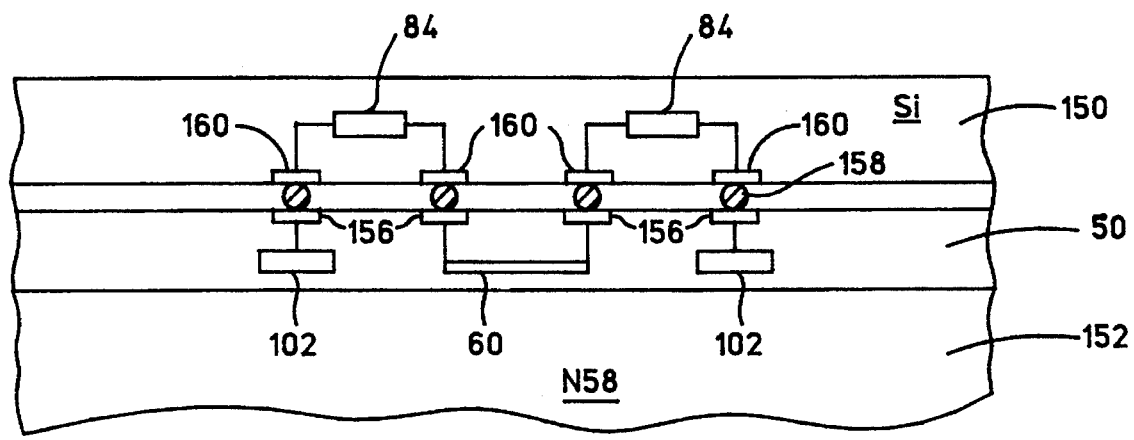
FIG. 28 is a schematic diagram illustrating the use of solder balls and solder reflow for bonding a silicon bar to an N58 bar as shown in FIGS. 26 and 27.

A row 150 of protective elements 84 is bonded to a row 152 of heads 50 using conventional bonding techniques, such as solder ball-grid away or solder reflow. For example as shown in FIG. 28, solder balls 158 may be provided on the head terminal pads 156 and reflowed after placement of the row 150 of protective elements over the row of heads. The reflowed solder serves not only to bond the row 150 of protective elements to the row 152 of heads, but also to electrically connect the head terminal pads 156 to corresponding terminal pads 160 for the protective elements 84 (terminal pad connections 88 as illustrated in FIG. 10).

Obviously, other embodiments and modifications of the invention will occur to those of ordinary skill in the art in view of the above teachings. Therefore, the invention is to be limited only by the following claims, which include all of such embodiments and modifications when viewed in conjunction with the above specification and accompanying drawings.

We claim:

1. A method of manufacturing a magnetoresistive (MR) head and slider, the MR head having an MR stripe, the method comprising the steps of:

providing a silicon wafer which has a pair of oppositely facing substantially flat faces;

fabricating one or more silicon circuit devices in the silicon wafer;

dicing the silicon wafer into bars, each said bar including a plurality of said circuit devices;

providing a slider wafer which has a substantially flat face;

fabricating a plurality of MR heads with MR stripes on said flat face of the slider wafer;

dicing the slider water into bars, each bar having a row of MR heads;

fixedly joining each of said silicon bars to a separate one of said slider bars to provide a plurality of composite silicon/slider bars with one of the flat faces of each silicon bar facing the flat face of the slider bar;

lapping each said composite bar to provide each MR head on the bar with an air bearing surface; and dicing each said composite bar into individual MR head and slider units.

2. A method as claimed in claim 1 wherein said slider wafer comprises a ceramic material.

3. A method as claimed in claim 1 comprising the steps of:

after fabrication of said silicon circuit devices connecting the silicon circuit devices to terminal pads at one face of the silicon wafer;

fabricating said plurality of MR heads on the slider wafer with the MR stripes connected to terminal pads on the MR heads; and said step of fixedly joining said silicon bars to said slider bars including the step of connecting the terminal pads on the MR heads to corresponding ones of said terminal pads on the silicon wafer.

4. A method as claimed in claim 1 wherein at least some of the silicon circuit devices comprise conductive devices.

5. A method as claimed in claim 4 comprising the additional steps of:

fabricating each MR head with the MR stripe sandwiched between first and second gap layers, the first and second gap layers sandwiched between first and second shield layers, a coil layer sandwiched between first and second insulation layers and the insulation layers sandwiched between first and second pole pieces; and connecting said conductive devices and the MR stripes such that the MR stripe in each MR head is connected to the first and second shield layers and the coil layer via respective conductive devices.

6. A method as claimed in claim 2 wherein said slider wafer comprises titanium carbide.

7. A method as claimed in claim 2 wherein said slider wafer comprises titanium carbide-aluminum oxide.

8. A method as claimed in claim 4 wherein each said conductive device comprises back to back silicon diodes.

9. A method as claimed in claim 4 wherein each said conductive device comprises back to back transistors.

10. A method as claimed in claim 5 wherein at least one of said conductive devices comprises a pair of back to back connected diodes connected in parallel with said MR stripe.

11. A method as claimed in claim 3 wherein said step of fixedly joining said silicon bars to said slider bars includes the steps of:

providing solder balls between each said MR head terminal pad and said corresponding silicon wafer terminal pad;

pressing said silicon bar and said slider bar together providing contact between said terminal pads and said solder balls; and reflowing said solder balls for providing electrical contact between said MR head and corresponding silicon bar terminal pads and adhesion between said silicon bars and said slider bars.

* * * * *